(12) United States Patent
Schmidt et al.

(10) Patent No.: US 7,219,478 B2
(45) Date of Patent: May 22, 2007

(54) CONCRETE REINFORCEMENT STRUCTURE

(75) Inventors: Paul Schmidt, Pretty Prairie, KS (US); Gene Lamb, Kingman, KS (US); David Anderson, Kingman, KS (US)

(73) Assignee: Polymer Group, Inc., North Charleston, SC (US)

( * ) Notice: Subject to any disclaimer, the term of this patent is extended or adjusted under 35 U.S.C. 154(b) by 259 days.

(21) Appl. No.: 10/858,315

(22) Filed: Jun. 1, 2004

(65) Prior Publication Data

US 2005/0011161 A1 Jan. 20, 2005

Related U.S. Application Data

(60) Provisional application No. 60/475,038, filed on Jun. 2, 2003.

(51) Int. Cl.
*E04B 1/00* (2006.01)
*E04G 21/00* (2006.01)

(52) U.S. Cl. .................. 52/745.17; 52/721.4; 52/724.3; 156/72; 156/172; 156/187; 156/191; 264/32; 405/216

(58) Field of Classification Search .............. 52/167.1, 52/167.9, 170, 222, 309.17, 653, 514, 721.1, 52/721.4, 724.1, 724.3, 724.5, 745.17, 745.18, 52/722–725, 600, 741.3; 264/137, 136, 32, 264/35, 3.6, 228–229, 135; 156/171–175, 156/71, 167, 191, 94, 187; 405/216
See application file for complete search history.

(56) References Cited

U.S. PATENT DOCUMENTS

| | | | | |
|---|---|---|---|---|
| 1,212,759 A | * | 1/1917 | Frost et al. ................. 52/724.3 |
| 1,412,096 A | * | 4/1922 | Von Emperger ........... 52/724.4 |
| 1,465,307 A | * | 8/1923 | Keogan ...................... 52/724.3 |
| 1,556,178 A | * | 10/1925 | Tallaksen ................... 52/649.4 |
| 3,320,728 A | * | 5/1967 | Spencer et al. ............... 96/133 |
| 3,421,272 A | * | 1/1969 | Walker, Jr. ................. 52/127.8 |
| 3,429,758 A | * | 2/1969 | Young ......................... 156/79 |
| 3,505,825 A | * | 4/1970 | Colby ........................ 405/223 |
| 3,551,237 A | * | 12/1970 | Cox et al. .................... 156/175 |
| 3,577,504 A | * | 5/1971 | Lipski ........................ 264/255 |
| 3,813,098 A | * | 5/1974 | Fischer et al. .............. 473/561 |
| 3,846,085 A | | 11/1974 | Dunn, Jr. |
| 3,938,292 A | * | 2/1976 | Kawasaki et al. ........ 52/741.13 |
| 3,990,200 A | * | 11/1976 | Kawasaki et al. .......... 52/169.1 |
| 4,019,301 A | * | 4/1977 | Fox ............................ 52/721.4 |
| 4,023,374 A | * | 5/1977 | Colbert et al. .............. 405/216 |
| 4,068,483 A | * | 1/1978 | Papworth .................... 405/216 |
| 4,228,641 A | | 10/1980 | O'Neil |
| 4,244,156 A | * | 1/1981 | Watts, Jr. .................... 52/746.1 |
| 4,283,238 A | | 8/1981 | Jacquemart .................. 156/49 |
| 4,439,070 A | * | 3/1984 | Dimmick .................... 405/216 |
| 4,439,071 A | * | 3/1984 | Roper, Jr. .................... 405/216 |
| 4,676,276 A | * | 6/1987 | Fawley ....................... 138/172 |
| 4,700,752 A | * | 10/1987 | Fawley ....................... 138/172 |
| 4,764,054 A | * | 8/1988 | Sutton ........................ 405/216 |
| 4,786,341 A | * | 11/1988 | Kobatake et al. ............. 156/71 |
| 4,892,601 A | * | 1/1990 | Norwood ..................... 156/94 |
| 5,456,752 A | | 10/1995 | Hogan |
| 5,628,822 A | | 5/1997 | Hogan |
| 5,649,398 A | | 7/1997 | Isley, Jr. et al. |
| 5,807,458 A | | 9/1998 | Sanders et al. |
| 6,189,286 B1 | | 2/2001 | Seible et al. |
| 6,219,991 B1 | * | 4/2001 | Salek-Nejad ............... 52/741.3 |
| 6,258,159 B1 | | 7/2001 | Pyle |
| 6,423,134 B1 | | 7/2002 | Trottier et al. |
| 6,519,909 B1 | | 2/2003 | Fawley |
| 6,543,487 B2 | * | 4/2003 | Bazinet ....................... 138/99 |
| 6,569,525 B2 | | 5/2003 | Rieder et al. |
| 6,569,526 B2 | | 5/2003 | Rieder et al. |
| 6,599,632 B1 | * | 7/2003 | Gillette et al. .............. 428/447 |
| 6,718,723 B1 | * | 4/2004 | Al-Tuhami ............... 52/745.17 |
| 6,901,717 B2 | * | 6/2005 | Brunozzi et al. ........... 52/723.1 |
| 6,964,141 B2 | * | 11/2005 | Igarashi ..................... 52/746.1 |
| 7,141,284 B2 | * | 11/2006 | Newton et al. ............. 428/40.1 |
| 2003/0044592 A1 | | 3/2003 | Perez et al. |

* cited by examiner

*Primary Examiner*—Jeanette Chapman
(74) *Attorney, Agent, or Firm*—Wood, Phillips, Katz, Clark & Mortimer

(57) ABSTRACT

This invention relates to a reinforcement structure which is used in providing cementitious mixtures supplemental support and strength upon setting, and more particularly, to a reinforcement structure which comprises a plurality of oriented reinforcing fibrous and/or filamentary components having a finite cut length, and fastening the reinforcing fibrous and/or filamentary components by one or more circumferential retaining elements.

7 Claims, 1 Drawing Sheet

CONCRETE REINFORCEMENT STRUCTURE

TECHNICAL BACKGROUND

This invention relates to a reinforcement structure which is used in providing cementitious mixtures supplemental support and strength upon setting, and more particularly, to a reinforcement structure which comprises a plurality of oriented reinforcing fibrous and/or filamentary components having a finite cut length, said reinforcing fibrous and/or filamentary components fastened by one or more circumferential retaining elements.

BACKGROUND OF THE INVENTION

The use of metal rods or "rebar" is a common and economical way to reinforce concrete. These rods, usually of steel, are available in a number of different sizes and lengths. The rods are typically cut and bent to fit the concrete structure, and the concrete is then placed around and over the rods. The reinforcing rods are completely embedded in the concrete matrix. As the mixture hardens, the concrete bonds strongly to the surface of the rods which, in turn, impart flexural strength to the concrete mass. Of course, rods do not come in the exact lengths for all concrete forms. Typically, the rods must be cut and spliced to fit a particular job. Because the final strength of the cured concrete depends on the strength of the reinforcing rods, splices must not weaken the rod.

The strength of the hardened concrete depends, to a great extent, on the strength of the reinforcing rods. Therefore, corrosion of the rods becomes a serious problem. Hardened concrete is somewhat porous so that air and moisture can penetrate and contact the reinforcing rods and promote oxidation (rust). Furthermore, the wet concrete itself is alkaline, which can further promote the corrosion of the metal. When rods rust, they not only lose their strength, but they also swell, causing the concrete to split.

An unmet need exists for a reinforcing structure that provides cementitious mixtures with the necessary strength and support that steel reinforcement currently provides, but is insusceptible to corrosion, bends more easily, lightweight, cuts easily, and able to be thermally bonded to itself more easily in cross-overs.

SUMMARY OF THE INVENTION

This invention relates to a reinforcement structure which is used in providing cementitious mixtures supplemental support and strength upon setting, and more particularly, to a reinforcement structure which comprises a plurality of oriented reinforcing fibrous and/or filamentary components having a finite cut length, and fastening the reinforcing fibrous and/or filamentary components by one or more circumferential retaining elements.

In a first embodiment, the reinforcement structure of the present invention is formed from two or more reinforcing fibrous and/or filamentary components of finite staple length and essentially parallel orientation. In a second embodiment, the reinforcement structure of the present invention is formed from two or more reinforcing fibrous and/or filamentary components of infinite length and essentially parallel orientation. The reinforcement structure may comprise both fibers and filaments, wherein the fibers and filaments may be of similar or dissimilar materials and further provide similar or dissimilar functions within the cementitious mixture. Further, the orientation of the fibrous and/or filamentary components may be other than that of a parallel orientation, other orientations may include a twisted orientation or an interwoven orientation, wherein the components are intertwined with one another.

The compositions of the reinforcing components is selected from the group consisting of synthetic polymers, natural polymers, and the combinations thereof, and are not necessarily of the same polymeric composition, denier, finite staple length, or functionality. Once the cementitious mixture is deposited over and around the reinforcement structure, the mixture is able to penetrate the parallel orientation of the reinforcing fibrous and/or filamentary components of the reinforcement structure. Further, the reinforcing fibrous and/or filamentary components provide more surface area for the cementitious mixture to hold onto upon drying.

The reinforcement structure comprises one or more circumferential retaining elements that maintain the integrity of the reinforcement structure. Suitable circumferential retaining elements include chemical and/or mechanical means, including a binder that exhibits sufficient durability to maintain the orientation of the reinforcing fibrous and/or filamentary components. Additional circumferential retaining elements include, but are not limited to clips, wires, ties, adhesives, and other various retaining means comprised of synthetic polymers and/or natural polymers. Optionally, the reinforcing fibrous and/or filamentary components may comprise an chemical and/or mechanical internal interlocking system that maintains the orientation of the components.

Preferably, the one or more circumferential retaining elements comprises no more than 80% of the total surface area of the reinforcement structure; more preferably comprises no more than 50% of the total surface area of the reinforcement structure; and most preferably comprises no more than 30% of the total surface area of the reinforcement structure, wherein the total surface area is defined as the overall length and circumference of the reinforcement structure. Limiting the circumferential retaining elements serves to expose the significant and useful proportion of the oriented reinforcing fibrous and/or filamentary components to the external environment.

It should be noted that the reinforcing fibrous and/or filamentary components, as well as the resulting reinforcement structure, can be further treated with performance modifying additives, such as represented by the topical application of a material flow-enhancing lubricant. Further, additional temporary binding agents, including water-soluble chemistries such as polyvinyl alcohol, can be used in conjunction with a primary interlocking means.

Upon final formation of the reinforcement structure, the structure can be more easily handled than steel reinforcement structures. The reinforcement structure of the present invention may prolong the life span of cementitious construction due to its durability and resistance to corrosion, which tends to result in cracks, having an overall deleterious affect on cementitious construction. Further, the reinforcement structure of the present invention is lightweight and easily bent to fit small spaces. Further still, the reinforcement structure more readily thermally bonds to itself compared to steel.

Other features and advantages of the present invention will become readily apparent from the following detailed description, the accompanying drawings, and the appended claims.

DETAILED DESCRIPTION

Figure 1:
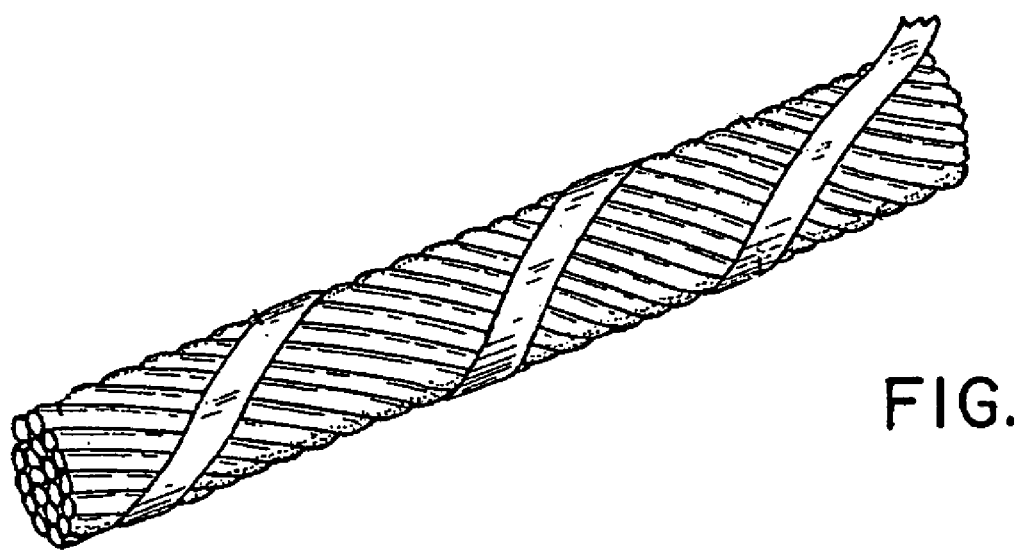
FIG. 1 is a diagrammatic view of a reinforcement structure embodying the principles of the present invention.

While the present invention is susceptible of embodiment in various forms, hereinafter is described a presently preferred embodiment of the invention, with the understanding that the present disclosure is to be considered as an exemplification of the invention, and is not intended to limit the invention to the specific embodiment illustrated.

Steel reinforcement bars are routinely used in cementitious mixtures so as to render a corresponding cured cementitious construct more resistant to structural defect and failure. Due to difficulties encountered in the actual handling of the steel reinforcement bars and the poor performance experienced in the cured cementitious construct, the present invention is directed to a means for providing the necessary strength and support to acementitious construct without deleterious affecting the cementitious construct.

In accordance with the present invention, the reinforcement structure comprises a plurality of reinforcing fibrous and/or filamentary components, wherein the fibrous and/or filamentary components have an essentially parallel orientation. Optionally, the reinforcing fibrous and/or filamentary components of the reinforcement structure may be twisted or interwoven with one another.

In a first embodiment, the reinforcement structure of the present invention is formed from two or more reinforcing fibrous and/or filamentary components of finite staple length and essentially parallel orientation. In a second embodiment, the reinforcement structure of the present invention is formed from two or more reinforcing fibrous and/or filamentary components of infinite length and essentially parallel orientation. The reinforcement structure may comprise both fibers and filaments, wherein the fibers and filaments may be of similar or dissimilar materials and further provide similar or dissimilar functions within the cementitious mixture.

The composition of such reinforcing fibrous and/or filamentary components is selected from the group consisting of synthetic polymers, natural polymers, and the combinations thereof. Preferably, the composition of the reinforcing fibrous and/or filamentary components is selected from the synthetic polymers including, without limitation, thermoplastic and thermoset polymers. A particularly preferred embodiment of the present invention is directed to reinforcing staple fibers comprising polyolefin thermoplastic resins. It is within the purview of the present invention that the individual reinforcing fibrous and/or filamentary components as incorporated in the reinforcement structure need not necessarily be of the same polymeric composition, denier, finite staple length, or functionality.

The reinforcing filamentary components of the present invention may be manufactured by directly extruding a polymeric sheet into a bath comprised of water so as to instantly quench the extruded film, slitting the film into ribbons, and chopping the film filaments into preselected widths. Optionally, the film filaments may be fibrillated, micro-fibrillated, or imparted with some texture to enhance adhesion of the cementitous mixtures to the filamentary components. Further, the filamentary components may be manufactured in accordance with U.S. published patent application 20030044592A1, to Perez, et al., hereby incorporated by reference, wherein the filaments may be prepared by extruding a cast film of melt processable polymer, length orienting said cast film, slitting said oriented film into ribbons of preselected widths, and chopping said fibers to preselected lengths. If desired, the fibers may be shaped, or a pattern imparted to one or more surfaces.

The reinforcement structure comprises one or more circumferential retaining elements that maintain the integrity of the reinforcement structure. Suitable circumferential retaining elements include chemical and/or mechanical means, including a binder that exhibits sufficient durability to maintain the orientation of the reinforcing fibrous and/or filamentary components. Additional circumferential retaining elements include, but are not limited to clips, wires, ties, adhesives, and other various retaining means comprised of synthetic polymers and/or natural polymers. Optionally, the reinforcing fibrous and/or filamentary components may comprise a chemical and/or mechanical internal interlocking system that maintains the orientation of the reinforcing fibrous and/or filamentary components.

Preferably, the one or more circumferential retaining elements comprises no more than 80% of the total surface area of the reinforcement structure; more preferably comprises no more than 50% of the total surface area of the reinforcement structure; and most preferably comprises no more than 30% of the total surface area of the reinforcement structure, wherein the total surface area is defined as the overall length and circumference of the reinforcement structure. Limiting the circumferential retaining elements serves to expose the significant and useful proportion of the oriented reinforcing fibrous and/or filamentary components to the external environment. In addition, the exposure of the reinforcing fibrous and/or filamentary components allows for optimal penetration of the cementitous mixture into the reinforcement structure and an increase in surface area for the cementitous mixture to hold on to upon drying. In order to further increase the amount of surface area available to the cementitous mixture, the reinforcing fibrous or filamentary components and/or the circumferential retaining elements of the reinforcement structure may have a textured surface or raised surface asperities, such as nubs.

In accordance with the present invention, the reinforcing fibrous and/or filamentary components may also be of infinite length, whereby one or more circumferential retaining elements circumscribe about the overall circumference of the continuous reinforcing fibrous and/or filamentary components. Upon final formation of the reinforcement structure, the continuous structure can be readily packaged through an automatic packaging system or containerized in bulk. A continuous formation of the reinforcement structure allows the reinforcement structure to be available in a continuous roll form or packaged in a continuous lap or coil formation to be cut to desired lengths. Further, the reinforcement structure may comprise a series of segmented weakened points along the continuous formation so that the desired portion may be selected and detracted from the remainder of the roll form.

It should be noted that the reinforcing fibrous and/or filamentary components, as well as the resulting reinforcement structure, can be further treated with performance modifying additives, such as represented by the topical application of a material flow-enhancing lubricant and additional temporary binding agents, such as supplimental water-soluble chemistries and pro-degradants.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A method of improving the properties of a cementitious construct, wherein said method comprises the steps of:
   a. providing a cementitious mixture;
   b. providing a reinforcement structure, each reinforcement structure being comprised of:
      i. two or more reinforcing components exhibiting a finite staple length; said two or more reinforcing components comprising at least one of fibrosus and filamentary components
      ii. one or more circumferential retaining elements;
      iii. wherein said reinforcing components are combined in an essentially parallel orientation and said one or more circumferential retaining elements is applied about an overall circumference described by said combined and essentially parallel reinforcing components; and
   c. pouring said cementitious mixture over one or more of said reinforcement structures.

2. A method of improving the properties of a cementitious construct, wherein said method comprises the steps of:
   a. providing a cementitious mixture;
   b. providing a reinforcement structure, each reinforcement structure being comprised of:
      i. two or more reinforcing components exhibiting an infinite length; said two or more reinforcing components comprising at least one of fibrous and filamentary components
      ii. one or more circumferential retaining elements;
      iii. wherein said reinforcing components are combined in an essentially parallel orientation and said one or more circumferential retaining elements is applied about an overall circumference described by said combined and essentially parallel reinforcing components; and
   c. pouring said cementitious mixture over one or more of said reinforcement structures.

3. A method as in claim 2, wherein said one or more circumferential retaining elements comprises no more than 80% of the total surface area of said reinforcement structure.

4. A method as in claim 1, wherein said one or more circumferential retaining elements comprises no more than 80% of the total surface area of said reinforcement structure.

5. A method as in claim 1 wherein the reinforcing components comprise polymer composition.

6. A method as in claim 1, wherein the reinforcing components comprise polyolefin thermoplastic resins.

7. A method as in claim 2, wherein the reinforcing components comprise polymer composition.

* * * * *